Nov. 25, 1958    H. M. B. RÉCOPÉ DE TILLY BLARU    2,862,038
SELF-PRIMING ELECTRIC CELLS AND BATTERIES
Filed Aug. 8, 1955    2 Sheets—Sheet 1

INVENTOR
HUBERT M.B. RÉCOPÉ DE TILLY BLARU
BY

Nov. 25, 1958   H. M. B. RÉCOPÉ DE TILLY BLARU   2,862,038
SELF-PRIMING ELECTRIC CELLS AND BATTERIES
Filed Aug. 8, 1955                                                2 Sheets-Sheet 2

United States Patent Office 2,862,038
Patented Nov. 25, 1958

2,862,038

SELF-PRIMING ELECTRIC CELLS AND BATTERIES

Hubert Marie Bernard Récopé de Tilly Blaru,
Paris, France

Application August 8, 1955, Serial No. 527,034

Claims priority, application France August 21, 1954

2 Claims. (Cl. 136—90)

This invention provides a self-priming electric battery particularly characterized in that each of the elements or cells thereof is formed of a pair of parallel electrodes arranged face to face at a certain distance apart and in such manner as to be capable of being moved towards each other, sealing means being provided around the edges of the electrodes to isolate the space between them from the surrounding medium, and a frangible container or bag of flexible insulating material filled with an electrolyte and disposed between said electrodes in such a manner that when the electrodes are moved towards one another the bag is burst and the electrolyte freed to bridge the electrodes so that the element or cell is consequently primed or rendered active.

Insulated stops are preferably provided to restrict the reciprocal approach of the electrodes and prevent any short circuit between two opposed electrodes at the instant of priming.

At least one of such electrodes can advantageously be provided on the side facing the bag containing the electrolyte with points or protuberances to assist in the bursting of the bag.

The foregoing and other features of the invention will be apparent from the following description and the accompanying drawing which shows one embodiment by way of example, and in which.

Figure 1:
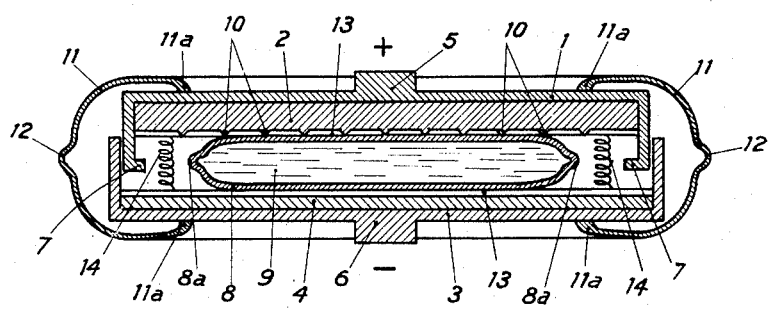
Fig. 1 is a section through an element or cell of the self-priming battery.

The element or cell represented in Fig. 1 comprises an upper tray 1 holding the positive electrode 2, and a lower tray 3 holding the negative electrode 4. The trays 1 and 3 are of metal and are coated or sheathed with an insulating substance except in the parts making contact with the electrodes 2 and 4 and at the terminals 5 and 6 for the external connections of the battery. The edge of the tray 1 fits within the edge of the tray 3 in such a manner as to enable the former to slide in the latter. Stops 7 of suitable height, covered with insulating material, are appropriately arranged so as to restrict the movement of the tray 1 towards the tray 3 and thus prevent any short circuit forming between the positive electrode 2 and the negative electrode 4. A collapsible bag 8 of flexible insulating material is arranged between the two electrodes, this bag containing the electrolyte 9. The rupture strength of the bag 8 is so adjusted that it can be burst by exerting a suitable force on the trays 1 and 3 causing them to approach each other. The bag 8 can suitably be provided with a lateral, circumferential bead or rib 8a assisting its collapse when burst; further, the bag can be provided with weak spots assisting it to burst.

One of the electrodes (the positive electrode 2 in the example illustrated) may be provided with superficial points or protuberances 10 to aid in bursting the bag 8 when the trays 1 and 3 are pressed together.

The element or cell is surrounded along its outer edge by an elastic envelope or sheath 11 of impermeable, insulating material, welded or cemented at its edges 11a to the trays 1 and 3. This sheath may be provided with a rib or bead 12 to increase its flexibility.

The sheath 11 seals the cell assembly both from escape of the liquid released from the bag 8 after the bursting and priming, and with regard to a vacuum which may have been formed within the cell.

Layers 13 of cotton or other absorbent substance may be placed between the bag 8 and the electrodes 2 and 4 for the purpose of promoting rapid diffusion of the electrolyte 9 after bursting of the bag.

Small springs 14 may be provided to maintain the electrodes 2 and 4 at a suitable distance apart when in the inactive or resting position, to prevent accidental priming. Such springs must be sheathed with insulating material to preclude a short circuit between the electrodes.

The priming of the cell thus described above is effected by applying to the trays 1 and 3 a force sufficient to cause them to approach each other and thus to burst the bag 8 between them. The electrolyte 9 is by this means released and enabled to prime the battery. The impermeable sheath 11 ensures complete insulation of the individual cells of the battery from each other.

For the purpose of simultaneously priming all the cells of a particular battery, all the trays 1 on the one hand, and all the trays 3 on the other hand, are positively linked or interconnected in such manner that the necessary priming pressure can be exerted on each such assembly as a whole.

Figure 2:
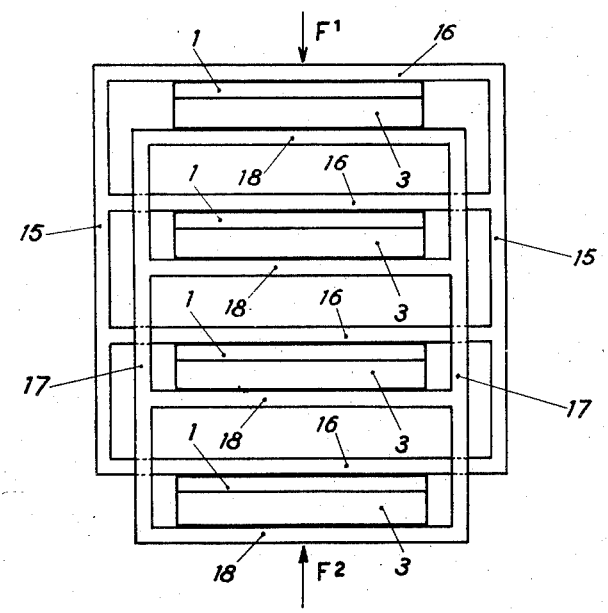
Fig. 2 is a diagrammatic view of an arrangement for simultaneously priming a number of cells.
Figure 1A:
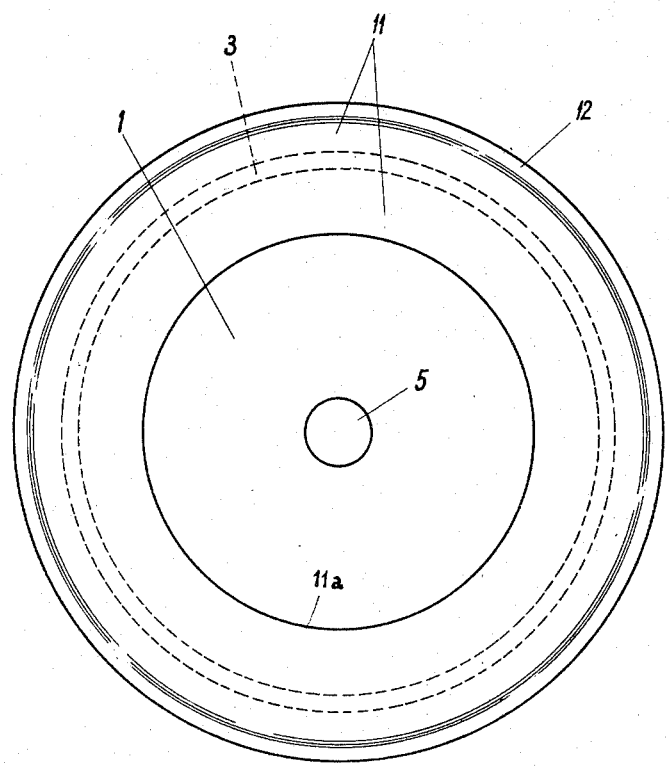
Fig. 1a is a plan view of the cell shown in Fig. 1.

Fig. 2 shows diagrammatically an arrangement enabling such simultaneous priming of a number of cells of the kind represented in Fig. 1.

A first system is formed by uprights 15 connected by cross-piece 16 supporting the upper trays 1 of all the cells which it is desired to prime simultaneously; while a second system is formed by uprights 17 and cross-pieces 18 supporting the lower trays 3 of the same cells. By applying pressure to these two systems causing them to move towards each other in the direction of the arrows F1 and F2, simultaneous compression and consequently simultaneous priming of all the cells is obtained. The necessary insulating means are provided to prevent short circuits between the electrodes, and the connections between the cells are suitably adapted to the fact that the terminals of the individual cells approach towards each other at the instant of priming.

Obviously, the invention is not restricted to the embodiment described and illustrated but applies equally to all other arrangements making use of the same principles.

I claim:

1. A self-priming battery cell comprising a pair of spaced electrodes movable towards each other, a pair of tray-like supports each supporting one of said electrodes and being movable therewith, said supports having telescoping insulated flanges and enclosing said electrodes, a frangible container formed of insulating material and containing an electrolyte, said container being disposed between said electrodes to be burst by movement of said electrodes toward each other, whereby the electrolyte is freed to bridge said electrodes and activate the cell, and flexible sealing means sealingly secured to said supports and hermetically sealing the space between said electrodes while accommodating movement of said electrodes relative to each other.

2. A battery comprising a plurality of juxtaposed self-priming cells; each of said cells including a positive and a negative electrode with said electrodes disposed in spaced relation but movable toward each other, a frangible container formed of insulating material and containing an electrolyte, said container being disposed between said electrodes to be burst by movement of said electrodes toward each other, whereby the electrolyte is freed to bridge said electrodes and activate the cell, and flexible sealing and insulating means enclosing said electrodes and hermetically sealing the space between said electrodes while accommodating movement of said electrodes relative to each other; and means rigidly connecting the corresponding electrodes of all of said cells for moving said electrodes in unison to simultaneously activate all of said cells.

References Cited in the file of this patent

UNITED STATES PATENTS

| | | |
|---|---|---|
| 1,432,025 | Hoppie | Oct. 17, 1922 |
| 1,856,386 | Heise | May 3, 1932 |
| 2,667,527 | Pucher | Jan. 26, 1954 |